United States Patent Office 3,507,475
Patented Apr. 21, 1970

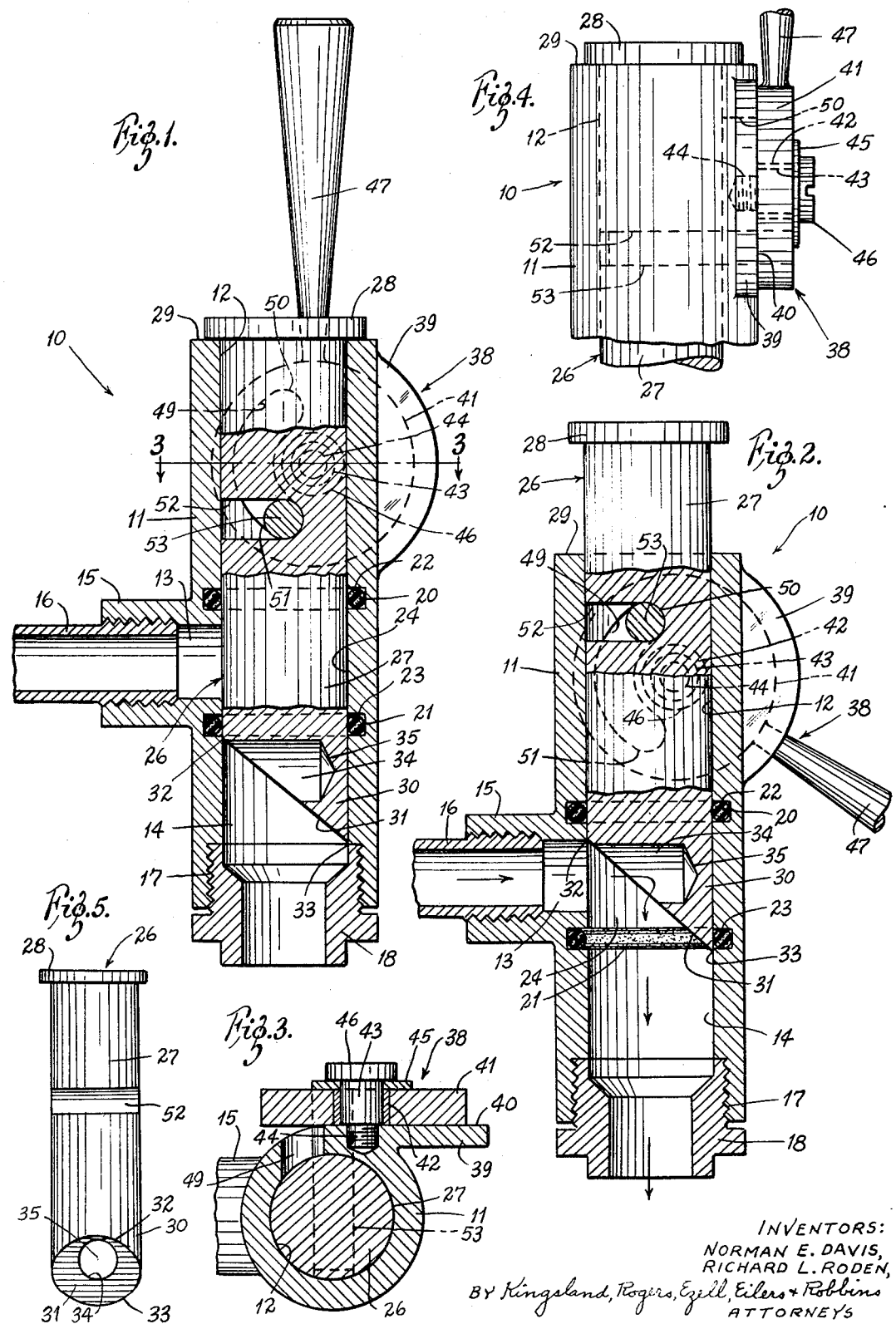

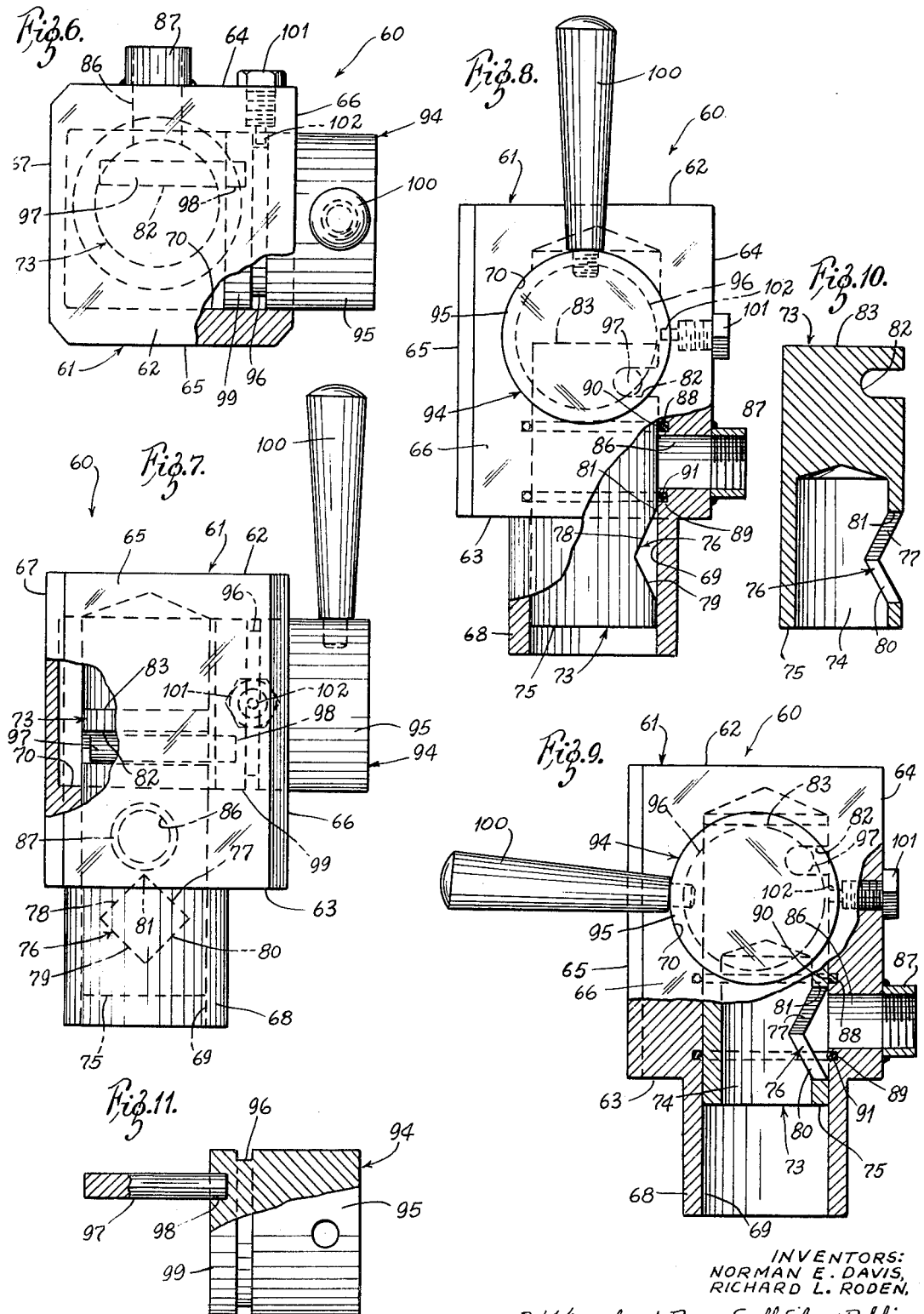

3,507,475
FAUCET VALVE
Norman E. Davis and Richard L. Roden, Dallas Tex.,
assignors to The John E. Mitchell Company, Dallas,
Tex., a corporation of Missouri
Filed Sept. 6, 1966, Ser. No. 577,425
Int. Cl. F16k 47/04, 31/528
U.S. Cl. 251—120                                     6 Claims

ABSTRACT OF THE DISCLOSURE

A valve having a cylindrical valve member slidable in a cylindrical chamber with which inlet and outlet ports communicate, and having an annular O-ring seal in the chamber between the inlet and the outlet for being pressed between the valve member and the chamber wall to block communication between the valve member and the chamber wall to block communication between the inlet and outlet ports when the valve member enters the O-ring, wherein the design of the end of the valve member is such as to prevent damage to the O-ring during operation of the valve.

This invention relates to a valve of the kind having a valve chamber, an inlet and outlet to the valve chamber, and a cylindrical valve member slidable in the valve chamber to alternately block and unblock flow through the chamber from the inlet to the outlet. The valve has O-rings in the wall of the chamber to prevent leakage of fluid past the valve member, and a particular feature of the invention is in the design of the valve member to prevent damage to the O-ring seals as the valve member is continuously operated.

The valve member may be used to control the flow of any fluid but is particularly useful for liquids and especially for dessert products consisting of partly or completely frozen particles, such as the product produced by the method and apparatus described in Knedlik Patent No. 3,044,878.

A particular object of the invention is to provide a valve having a valve member slidable into and out of an O-ring seal to alternately open and close the valve, wherein the end of the valve member that slides into and out of the seal is cut at an angle to the axis of the valve member to prevent abrupt entry of the entire end of the valve member into the seal, and thereby to prevent damage to the seal.

Another object of the invention is to provide a valve for regulating the flow of a liquid or a product of small fozen or partly frozen particles, the valve having a valve body with an inlet and an outlet to the body and with a valve member for blocking and unblocking communication between inlet and outlet wherein the valve member has means o reduce the rapid discharge thrust of product that conventionally occurs upon initial opening of the valve.

Other objects and advantages will be apparent to those skilled in the art.

In the drawings:

FIGURE 1 is a view in longitudinal medial section through the valve showing the valve in closed position;

FIGURE 2 is a view similar to that of FIGURE 1, but showing the valve in open position;

FIGURE 3 is a view in section taken along the line 3—3 of FIGURE 1;

FIGURE 4 is a fragmentary front elevation of the top portion of the valve;

FIGURE 5 is a reduced scale front elevation view of the valve member;

FIGURE 6 is a top plan view of a modified form of the valve, parts being shown in section;

FIGURE 7 is a rear elevation view of the modified valve, parts being shown in section;

FIGURE 8 is a side elevation view of the modified valve as viewed from the right side of FIGURE 7, showing the valve in closed condition, parts being shown in section;

FIGURE 9 is a side elevation view similar to FIGURE 8, but showing the modified valve in open condition;

FIGURE 10 is a view in longitudinal medial section through the valve member; and FIGURE 11 is a top plan view, partly in section, of the valve crank.

Referring to the drawings, the valve 10 shown in FIGURE 1 includes a body 11. There is a cylindrical bore 12 through the body 11 with an inlet port 13 extending through the side wall of the body into communication with the cylindrical bore 12. The lower end 14 of the bore 12 provides an outlet port. A boss 15 surrounding the inlet port 13 is internally threaded to receive a fluid conveying tube or pipe 16. There are also internal threads 17 adjacent the outlet port 14 for receiving any desired outlet nozzle 18.

A pair of O-rings 20 and 21 are mounted in annular grooves 22 and 23 in the side wall of the bore 12 on opposite sides of the inlet port 13. A valve chamber 24 is defined by the area in the bore 12 between the O-rings 20 and 21.

A valve member 26 is slidable within the bore 12. The valve member 26 has a cylindrical side wall 27. A dust cover 28 is formed at the upper end of the valve member 26.

The lower end 30 of the valve member is cut at an acute angle to the axis of the valve member to produce an inclined face 31. This angular cut causes the inclined face 31 to intersect the cylindrical side 27 in an edge 32, surrounding the face 31, that begins at its lower extreme as a point 33, and the edge 32 of the inclined face 31 gradually increases in circumference as it extends in an upward direction. A hole 34 is drilled into the body of the valve member 26 starting at the inclined face 31 and extending normal to the axis of the valve member. The bottom 35 of the hole 34 is spaced from the opposing side of the valve member 26.

The valve member 26 is operated by a crank mechanism 38. For this purpose, the valve body 11 is cast with a plate extension 39 adjacent its upper end to provide a flat outer side 40 against which a crank disk 41 can bear when it rotates. The crank disk 41 is mounted on a bearing sleeve 42 which is disposed about the shaft 43 of a crank pin 44 threaded into the valve body 11. A washer 45 is interposed about the shaft 43 of the crank pin between the crank disk 41 and the head 46 of the pin. The washer 46 bears against the bearing 42 to permit tightening of the crank pin 44 and still permit free rotation of the crank disk 41. A handle 47 on the crank disk 41 permits manual rotation of the crank disk.

There is an arcuate slot 49 through the side of the valve body 11 on which the plate extension 39 is cast. The arcuate slot 49 extends between an upper end 50 and a lower end 51, and the axis of its center is coxial with the axis of the crank pin 44. A slot 52 is also cut into a side of the valve member 26, and a pin 53 which is affixed to the crank disk 41 extends through the slot 49 and into the slot 52.

In operation, movement of the manual handle 47 rotates the crank disk 41 to revolve the pin 42 in the slot 49 between the ends 50 and 51. As the pin 53 swings, it bears against the sides of the slot 52 in the valve member 26 and causes the valve member to slide between the positions illustrated in FIGURES 1 and 4.

FIGURE 1 shows the valve member 26 in the blocking position. Here, the annular O-ring seal 21 is in contact with an entire circumference of the cylindrical side wall 27 of the valve member and is pressed between the valve member and the inner wall of the bore 12. Liquid or a product of frozen particles supplied from the tube 16 to the inlet 13 is thereby blocked from flowing to the outlet 14. The other annular O-ring 20 always maintains a seal against the passage of liquid or product to the area above the seal 20.

Normally, the valve is moved to the unblocking position illustrated in FIGURE 4 with a quick stroke of the handle 47. Now, the liquid entering the inlet 13 can flow past the lower end 30 of the valve member to the outlet 14. The inclined face 31 guides the product toward the outlet without undesirable buildup on the side wall 12 of the body 11. The recess or well 34 is provided to prevent sudden high velocity discharge of the product when the valve is first opened. With the recess 34, on first opening the valve to the position shown in FIGURE 4, the first and fastest moving portions of the product hit the well and are slowed down before discharging to the outlet 14. Thereafter, following portions of the product flow smoothly past the inclined face 31 to the outlet 14.

It will be noted that when the valve member 26 is in the full unblocking position illustrated in FIGURE 4, with the pin 53 stopped against the upper end 50 of the arcuate slot 49, the lower point 33 of the edge 32 of the inclined face 31 is below the O-ring seal 23. On moving the valve member 26 to the blocking position illustrated in FIGURE 1, the outer edge 32 of the inclined face 31 gradually enters and passes the O-ring 21 until the valve member 26 is in the full blocking position illustrated in FIGURE 1, and the O-ring contacts an entire circumference of the side 27. Because the inclined face 31 eliminates the abrupt concurrent contact with the entire inner surface of the O-ring that would occur if the lower end of the valve member were cut normal to its axis, rapid damage and cutting of the O-ring is eliminated. With this valve design, the valve can be operated repeatedly without damaging the O-ring, and the necessary fluid seal is maintained. A modified valve 60 is shown in FIGURES 6–11. The valve 60 has a body 61 with a top wall 62, a bottom wall 63, a front wall 64, a rear wall 65, and side walls 66 and 67. A sleeve 68 formed integrally with the body 61 extends downwardly from the bottom wall 63. A bore 69 extends upwardly through the sleeve 68 and the body 61, terminating short of the top wall 62. A round opening 70 extends through the sides 66 of the housing 61 past the bore 69, but terminating short of the other side 67.

A valve member 73 is slidably mounted within the bore 69. The valve member 73 has a generally cylindrical body with a recess 74 extending upwardly from its lower end 75. A diamond shaped opening 76 is cut through the side wall of the piston member 73 into communication with the recess 74. The opening 76 has straight sides 77, 78, 79, and 80, and as the sides 77 and 78 merge to their intersection 81, the circumference of the piston member 73 gradually increases from only a partial circumference to a complete circumference. There is a groove 82 in the side of the piston member 73 adjacent the upper end 83 thereof.

There is an inlet opening 86 through the front wall 64 of the housing 61. An internally threaded fitting 87 for a pipe leading from a source of liquid to be dispensed is welded to the housing 61 in communication with the inlet opening 86. When the valve member 73 is in the position shown in FIGURE 8, the inlet opening 86 is blocked by the wall of the valve member, but when the valve member is in the position shown in FIGURE 9, the opening 76 in the valve member communicates with the inlet opening 86.

An annular groove 88 is positioned above the inlet opening 86 and forms a ring about the bore 69. A similar annular groove 89 is positioned below the inlet opening 86. O-rings 90 and 91 are positioned within the annular grooves 88 and 89, respectively.

The piston member 73 is reciprocated by a crank 94. The crank 94 has a cylindrical body 95 with an annular groove 96 in it. A rod 97 is spaced from the axis of the body 95 and is permanently mounted in a recess 98 in the inner end 99 of the crank body 95. An operating handle 100 is threaded into the body 95 of the crank 94.

The crank 94 is positioned within the opening 70 with the rod 97 extending into the groove 82 in the piston member 73. A bolt 101 is threaded through the wall 64 of the valve housing 61 and has an integral pin 102 projecting from its inner end into the annular groove 96. The pin 102 permits rotation of the crank 94 while preventing axial movement within the opening 70.

In the operation of the valve 60 of FIGURES 6–11, the handle 100 is manually revolved from the position illustrated in FIGURE 8 to the position illustrated in FIGURE 9. In FIGURE 8, the valve is closed, the crank 94 being rotated to a position at which the rod 97 riding in the groove 82 has pushed the piston or valve member 73 to the downward position. In this downward position of the piston member 73, the opening 76 is entirely below the lower O-ring 91, and the O-rings 90 and 91 effectively block the flow of liquid past them. Hence, this downward position of the piston member 73 is the blocking or closed position of the valve.

When the handle 100 is revolved to the position illustrated in FIGURE 9, the rod 97 revolves and pushed the piston member 73 to the upper position illustrated in FIGURE 9. This moves the opening 76 upwardly beyond the O-ring 91 to a position opposite the inlet port 86 and liquid can flow from the port 86 through the opening 76 into the recess 74 whence it flows downwardly through the outlet opening 69.

To close the valve, the handle 100 is revolved back to the position illustrated in FIGURE 8. As the piston member 73 moves downwardly and approaches the O-ring 91, its circumference gradually passes the O-ring 91 because the opening 76 gradually closes as the intersection 81 between the sides 77 and 78 of the opening approach the O-ring 91. This prevents the abrupt passage of a wall past the O-ring 91 and therefore prevents cutting of the O-ring.

What is claimed is:

1. A valve member comprising a body, a valve chamber in the body having side wall means, a fluid inlet through the valve body to the valve chamber, a fluid outlet through the valve body from the valve chamber, a valve member slidable in the valve chamber, means to slide the valve member, the valve member having side wall means complementary to the side wall means of the valve chamber, the valve member having a wall movable between positions alternately blocking and unblocking communication between the inlet and the outlet when the valve member slides in the chamber, the wall of the valve member being shaped to define at least a portion of a passage between the inlet and the outlet to provide a substantially direct flow of fluid from the inlet to the outlet when the wall is in the unblocking position, a closed-end recess in the valve member extending in a direction away from the outlet, the recess being substantially aligned with the direction of flow of fluid through the inlet and being in the direct path of inlet fluid to prevent sudden high velocity discharge of the fluid flowing from the inlet upon initial movement of the wall of the valve member to unblocking position, an annular fluid seal permanently positioned in the side wall means of the valve chamber, the fluid seal being positioned between the inlet and the outlet, an entire circumference of the side wall means of the valve member being positioned within the seal when the valve member is in blocking position whereupon the seal is pressed between the valve member wall and the chamber wall to seal against the passage of fluid between the inlet and outlet, the said wall of the valve member being shaped to present a portion but less than a full circumference of the side wall of the valve member within the annular seal when the valve member is in the full unblocking position.

2. The valve of claim 1 wherein the side wall means of the valve chamber and valve member are cylindrical, the said wall of the valve member comprising an end of the valve member formed with a planar surface at an angle of less than ninety degrees to the axis of the valve member.

3. The valve of claim 2 wherein the annular seal comprises an O-ring.

4. The valve of claim 1 wherein the inlet extends through the side of the valve body in a direction substantially perpendicular to the axis of the valve member.

5. The valve of claim 1 wherein the means for sliding the valve member comprises a crank rotatably mounted on the valve body with an eccentric pin and slot connection between the crank and the valve member to cause the valve member to slide when the crank is rotated, and means for rotating the crank.

6. The valve of claim 5 including an annular seal between the valve chamber and the valve member and between the sliding means and the inlet and outlet.

References Cited

UNITED STATES PATENTS

| | | | |
|---|---|---|---|
| 937,096 | 10/1909 | Schmid | 251—325 |
| 2,568,520 | 9/1951 | Smith | 251—260 |
| 2,593,527 | 4/1952 | Berck | 251—287 X |
| 2,939,723 | 6/1960 | Wisniewski | 251—260 X |
| 2,980,392 | 4/1961 | Greenwood | 251—205 X |
| 2,084,397 | 6/1937 | Hildebrandt | 251—324 X |
| 3,406,705 | 10/1968 | Meyer | 137—207 |

FOREIGN PATENTS 742,080 12/1955 Great Britain.

WILLIAM F. O'DEA, Primary Examiner

D. R. MATTHEWS, Assistant Examiner

U.S. Cl. X.R.

251—251, 260, 324